United States Patent [19]

Braun

[11] 4,445,393
[45] May 1, 1984

[54] FLUID ACTUATED SHIFT BAR HOUSING ASSEMBLY

[75] Inventor: Eugene R. Braun, Royal Oak, Mich.

[73] Assignee: Eaton Corporation, Cleveland, Ohio

[21] Appl. No.: 340,151

[22] Filed: Jan. 18, 1982

[51] Int. Cl.³ .................. G05G 9/12; F16D 25/08; F15B 15/17
[52] U.S. Cl. .................. 74/346; 74/473 R; 74/475; 74/477; 74/DIG. 7; 91/172; 91/417 R; 92/30; 92/131; 92/134; 192/86; 192/87.14
[58] Field of Search .............. 74/335, 346, 473 R, 74/475, 477, DIG. 7; 91/172, 417 R; 92/30, 131, 134; 192/86, 87.14

[56] References Cited

U.S. PATENT DOCUMENTS

| 2,137,939 | 11/1938 | Eaton | 74/335 X |
|---|---|---|---|
| 2,491,087 | 12/1949 | Cardwell et al. | 92/131 |
| 2,924,111 | 2/1960 | Backus et al. | 74/336.5 |
| 2,931,237 | 4/1960 | Backus | 74/335 |
| 2,932,371 | 4/1960 | Backus et al. | 192/4 |
| 2,943,502 | 7/1960 | Perkins et al. | 74/339 |
| 2,943,719 | 7/1960 | McNamara | 192/3.5 |
| 2,974,766 | 3/1961 | Perkins et al. | 192/3.5 |
| 3,105,395 | 10/1963 | Perkins | 74/745 |
| 3,611,823 | 10/1971 | Richards et al. | 74/331 |
| 3,863,518 | 2/1975 | Webber et al. | 74/346 X |
| 4,152,949 | 5/1979 | Vandervoort et al. | 74/331 |
| 4,194,410 | 3/1980 | Richards | 74/339 |

FOREIGN PATENT DOCUMENTS

| 331654 | 1/1921 | Fed. Rep. of Germany | 192/87.14 |
|---|---|---|---|
| 502382 | 7/1930 | Fed. Rep. of Germany | 74/346 |

Primary Examiner—Allen D. Herrmann
Attorney, Agent, or Firm—C. H. Grace; H. D. Gordon

[57] ABSTRACT

A fluid actuated shift bar housing assembly for a change gear transmission wherein the shift bars are biased to an axially centered neutral position by constant fluid pressure in a constantly pressurized chamber and are selectively axially moved to an axially displaced gear engaged position by selective pressurization of a selectively pressurized chamber. A detent mechanism is provided for retaining the shift bars in the displaced positions thereof, said detent providing a resistance to axial movement of the shift bars having a smaller axial magnitude than the axial centering bias of the constant fluid pressure.

18 Claims, 18 Drawing Figures

| | CHAMBER | | | | | | | | | |
|---|---|---|---|---|---|---|---|---|---|---|
| SELECTED GEAR RATIO | 114 | 150 | 110 | 144 | 178 | 160 | 158 | 154 | 152 | 166 |
| N | X | X | X | X | X | O | O | O | O | O |
| R | X | X | X | X | X | X | O | O | O | O |
| 1 | X | X | X | X | X | O | X | O | O | O |
| 2 | X | X | X | X | X | O | O | X | O | O |
| 3 | X | X | X | X | X | O | O | O | X | O |
| 4 | X | X | X | X | X | O | O | O | O | X |

X = PRESSURIZED
O = VENTED

*Fig. 6*

FLUID ACTUATED SHIFT BAR HOUSING ASSEMBLY

BACKGROUND OF THE INVENTION

1. Field of the Invention

The present invention relates to fluid actuated shift bar housing assemblies for change gear transmissions and in particular relates to fluid actuated shift bar housing assemblies wherein a constant fluid bias is utilized to urge the shift bars into a first or neutral axial position, selectively applied fluid pressure is effective to urge a selected one of the shift bars into at least one second axial position for engaging a selected gear and a resilient detent means is porovided for retaining the selected shift bar in the gear engaged position in the event of a failure of fluid pressure to allow the vehicle or machine driven by the transmission to continue to operate in the engaged gear.

2. Description of the Prior Art

Shift bar housing assemblies wherein a plurality of axially movable shift bars, also known as shift rails and shift rods, each carrying or associated with a shift fork, are selectively axially moved to engage a selected transmission gear by axial movement of a clutch member, or of a gear carrying clutch teeth, are well known in the prior art as may be seen by reference to U.S. Pat. Nos. 3,105,395; 3,611,823, 4,152,949 and 4,194,410, all assigned to the assignee of this invention and all hereby incorporated by reference.

Fluid actuated shift bar housing assemblies, usually actuated by pressurized hydraulic fluid or pressurized air, and the controls therefor are also well known in the prior art as may be seen by reference to U.S. Pat. Nos. 2,924,111; 2,931,237, 2,932,371; 2,943,502; 2,943,719 and 2,974,766, all assigned to the assignee of this invention and all hereby incorporated by reference.

While the prior art fluidly actuated shift bar housing assemblies are generally satisfactory and are presently utilized, usually for remotely controlled and/or automatically controlled change gear transmissions, the prior art assemblies are not totally satisfactory as they were complicated and/or expensive to produce, install and/or service and/or they utilized springs or other means to center the shift rails in a neutral position which means tended to shift the transmission into neutral in the event of a loss of pressurized fluid which might undesirably render the driven device totally unusable.

SUMMARY OF THE INVENTION

In accordance with the present invention, the drawbacks of the prior art are minimized or overcome to the extent that a relatively simple and reliable pressurized fluid actuated shift bar housing assembly is provided which utilizes constant air pressure to urge the shift bars to a neutral axial position, and is provided with detent means to prevent shifting of a shift rail from a gear engaged axial position in the event of a failure of the pressurized fluid system.

The above is accomplished by providing a shift bar housing having a plurality of shift bars, or rails, axially slidable therein, each of the shift bars carrying a shift fork fixed thereto or associated therewith. Each shift bar has a first or neutral axial position corresponding to disengagement of the clutch member axially moved by the shift fork attached or associated thereto and at least one second axial position, or gear engaged position, corresponding to engagement of the clutch member moved by the shift fork attached or associated thereto. Constant fluid pressure is applied to first piston means which will tend to urge the shift bar from the second axial position, or positions, toward the first axial position. A second piston is selectively pressurized to overcome the bias of the first piston to move the shift bar from the first to the second axial position thereof. A common source of pressurized fluid, acting through a valve/control member, supplies pressurized fluid for the first and second piston chambers. A detent means, such as a ramped, spring biased plunger, is provided for retaining the shift bars in the second positions thereof, said detent means causing a resistance to axial movement of the shift bars having a smaller axial magnitude than the axial force supplied by the constantly pressurized first piston. Accordingly, if system pressurized fluid fails, the transmission will remain engaged. This is an important feature, especially in a vehicle transmission, as sudden undesired shifting into neutral is avoided, which could present a problem if the vehicle is on a steep grade, and also allows the vehicle to continue operating in the engaged gear, i.e. a "limp home" ability.

Accordingly, it is an object of the present invention to provide a new and improved fluid pressure operated shift bar housing assembly.

This and other objects and advantages of the present invention will become apparent from a reading of the description of the preferred embodiment taken in connection with the attached drawings.

DESCRIPTION OF THE PREFERRED EMBODIMENT

In this disclosure, certain terminology will be used for convenience in reference only and will not be limiting. For example, the terms "forward" and "rearward" will refer to directions forward and rearward of the transmission as normally mounted in a vehicle. The terms "rightward" and "leftward" will refer to directions in the drawings in connection with which the terminology is used. The terms "inwardly" and "outwardly" will refer to directions toward and away from, respectively, the geometric center of the apparatus. The terms "upward" and "downward" will refer to directions as taken in the drawings in connection with which the terminology is used. All foregoing terms mentioned above include the normal derivatives and equivalents thereof.

Figure 1:
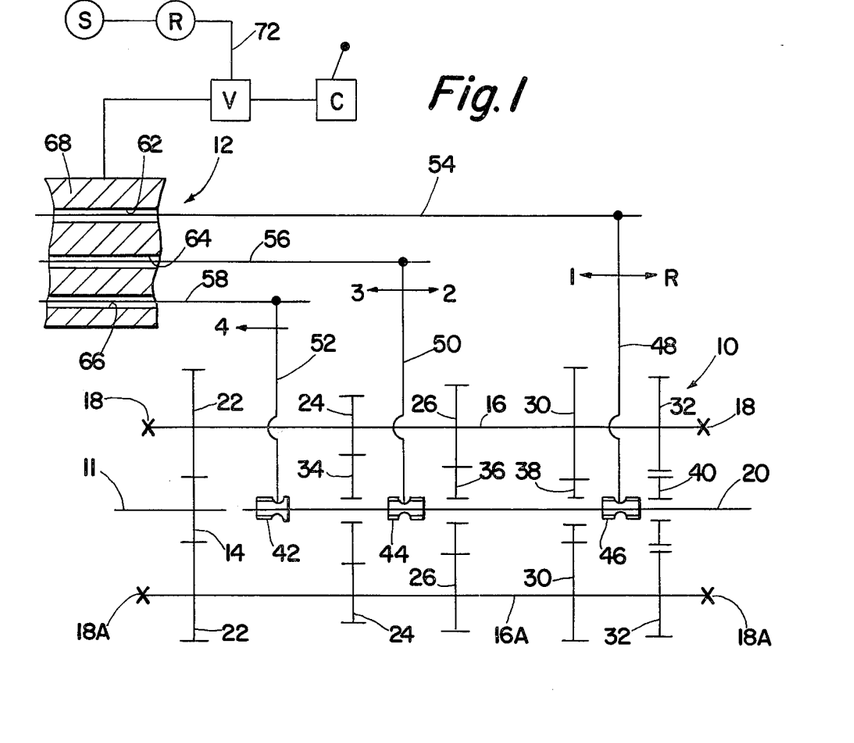
FIG. 1 is a schematic illustration of a change gear transmission utilizing the fluid pressure operated shift bar housing assembly of the present invention.

A typical change gear transmission 10 with which the improved fluid actuated shift bar housing assembly 12 of the present invention may be advantageously utilized may be seen by reference to FIG. 1. Transmission 10 is a simple transmission of the twin countershaft type which is well known in the art and which may be understood in greater detail by reference to U.S. Pat. Nos. 3,105,395 and 4,152,949.

The illustrated transmission 10 comprises an input shaft 11 carrying an input gear 14 for rotation therewith. Input shaft 11 is intended to be driven by a prime moved (not shown) by means of a master clutch or torque converter (not shown) as is well known in the art. A pair of substantially identical countershafts 16 and 16A are rotatably mounted in a housing (not shown) by means of bearings 18 and 18A. A mainshaft or output shaft 20 is provided which is preferably floatingly and/or pivotably mounted in the transmission housing. Each of the countershafts carry countershaft gears 22, 24, 26, 30 and 32 fixed thereto for rotation therewith. Countershaft gears 22 are constantly meshed with input gear 14. Third speed mainshaft gear 34 surrounds mainshaft 20 and is constantly meshed with and supported by the countershaft gears 24. Second speed mainshaft gear 36 surrounds mainshaft 20 and is constantly meshed with and supported by countershaft gears 26. First speed mainshaft gear 38 surrounds mainshaft 20 and is constantly meshed with and supported by countershaft gears 30. Reverse mainshaft gear 40 surrounds mainshaft 20 and is constantly meshed with and supported by a pair of idler gears (not shown) which in turn are constantly meshed with and driven by countershaft gears 32. Preferably, as is well known in the art, mainshaft gears 34, 36, 38 and 40 are radially movable relative to mainshaft 20. The advantages of utilizing a floating mainshaft 20 and/or floating mainshaft gears is well known in the art and may be appreciated in greater detail by reference to the aforementioned U.S. Pat. No. 3,105,395.

Axially slidable clutches 42, 44 and 46 are mounted, preferably by a splined connection, to mainshaft 20 for axial sliding movement relative thereto and for rotation therewith. Clutch 42 may be axially moved to the left from the neutral position shown to selectively couple mainshaft 20 directly with input gear 14 and input shaft 12 for fourth or direct drive of transmission 10. Clutch 44 may be axially moved from the position shown leftwardly to engage gear 34 with mainshaft 20 for third speed operation or moved rightwardly from the position shown to engage mainshaft 36 with mainshaft 20 for second speed operation. Clutch 46 may be axially moved from the position shown leftwardly to engage mainshaft gear 38 with mainshaft 20 for first speed operation or axially moved rightwardly to engage mainshaft gear 40 with mainshaft 20 for reverse operation.

Of course, clutches 42, 44 and/or 46 may be positive clutches, frictional clutches, blocked clutches and/or synchronized clutches A shift fork 48 is received in a groove in clutch 46 for controlling the axial position of clutch 46 relative to mainshaft 20. A shift fork 50 is received in a groove in clutch 44 for axially controlling the position of clutch 44 relative to mainshaft 20. A shift fork 52 is received in an axial groove in clutch 42 for controlling the axial position of clutch 42 relative to mainshaft 20.

Shift bar housing assembly 12 includes three axially movable shift bars or shift rods 54, 56 and 58 which are substantially parallel and axially slidable in substantially parallel bores 62, 64 and 66, respectively, in shift bar housing 68. Shift bar housing 68 is mountable to the transmission housing (not shown) in a conventional manner. Shift fork 48 is axially movable with shift bar 54, shift fork 50 is axially movable with shift bar 56 and shift fork 52 is axially movable with shift bar 58. Of course, various levers or other mechanical connections may be interposed between the shift bars and the shift forks as is well known in the art.

An operator operated control C is provided which will provide a signal indicitive of the control lever position to a valve V. Valve V is a fluid valve supplied with pressurized fluid from a source S which is preferably regulated by a regulator R. Valve V may be of any one of a plurality of known designs and will provide pressurized fluid to the shift bar housing assembly 12 to selectively axially position the shift bars as will be described below in greater detail. The signal from controller C to valve V may be fluid, electric, mechanical or a combination thereof as is well known in the art.

Figure 2A:
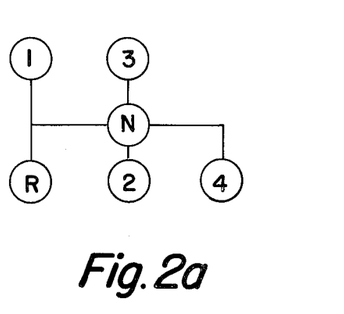
FIGS. 2A, 2B and 2C are schematic illustrations of possible shift patterns for the controls utilized in connection with the transmission of FIG. 1.
Figure 2B:
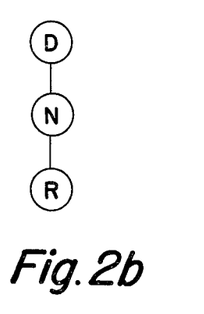
Figure 2C:
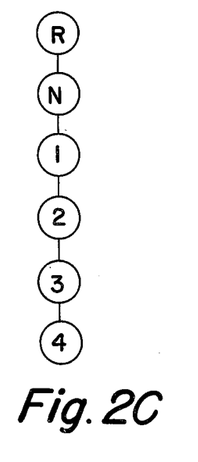

The various control patterns for control C may be seen by reference to FIGS. 2A, 2B and 2C. Of course, other control patterns may be equally advantageously utilized. Control patterns illustrated in FIGS. 2A and 2C are preferably utilized for a manually shifted transmission wherein the operator manually selects each gear speed change. FIG. 2B illustrates a typical control pattern for an automatic transmission wherein the operator may select drive (D) for forward speed operation, neutral (N), or reverse (R) for reverse operation.

Transmission 10 is illustrated as utilizing positive, nonsynchronized clutches as is well known in the art. Of course, frictional clutches, synchronized positive clutches and/or blocked clutches as are more fully described in U.S. Pat. No. 4,194,410 may be equally well utilized. As only one of the clutches should be engaged in any one time to avoid damage to the transmission, shift bar housing assembly 12 will include an interlock mechanism to prevent movement of more than one of the shift bars 54, 56 and 58 from the neutral axial positions thereof at a given time.

Figure 3:
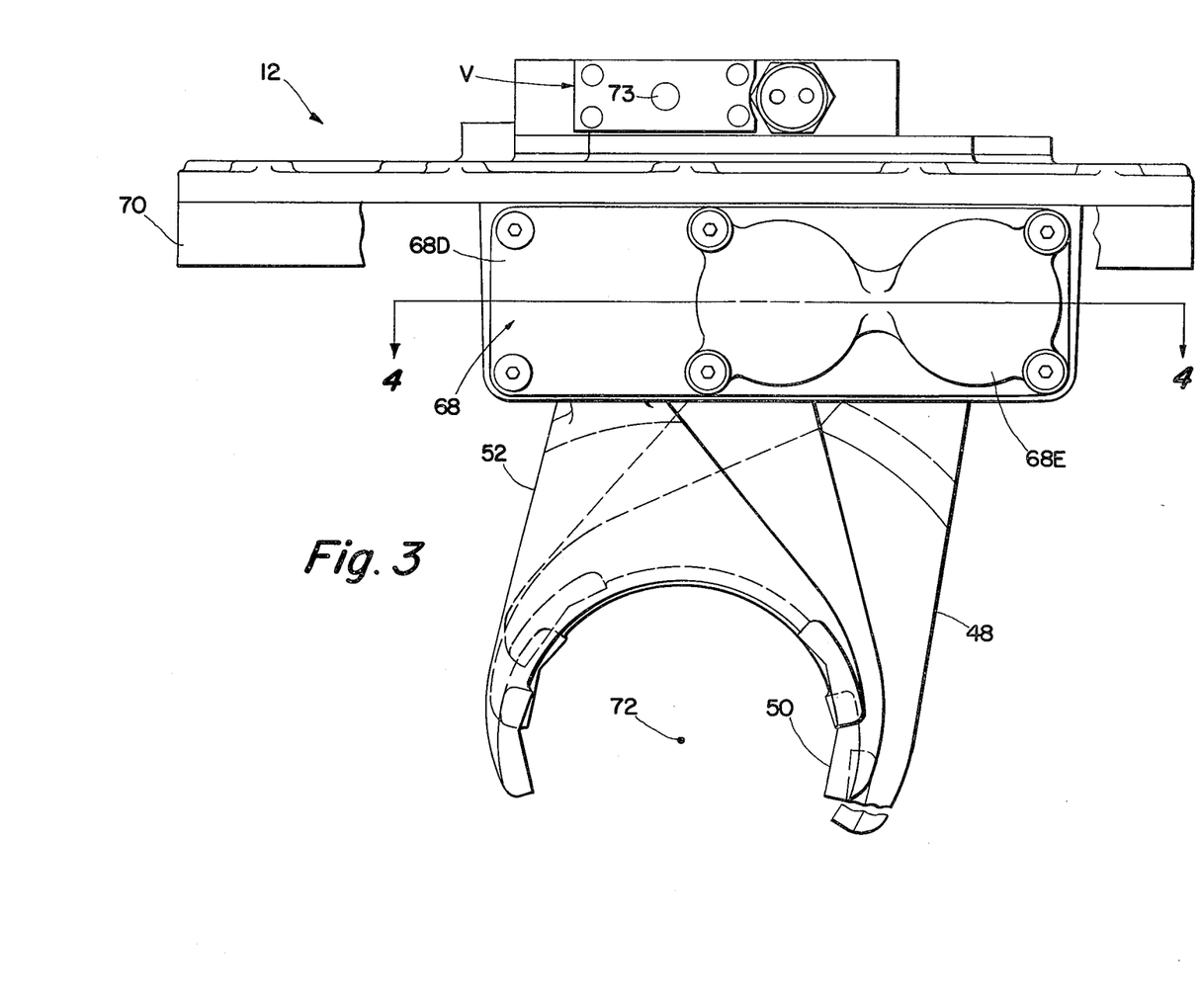
FIG. 3 is a front view of the shift bar housing assembly of the present invention.
Figure 4:
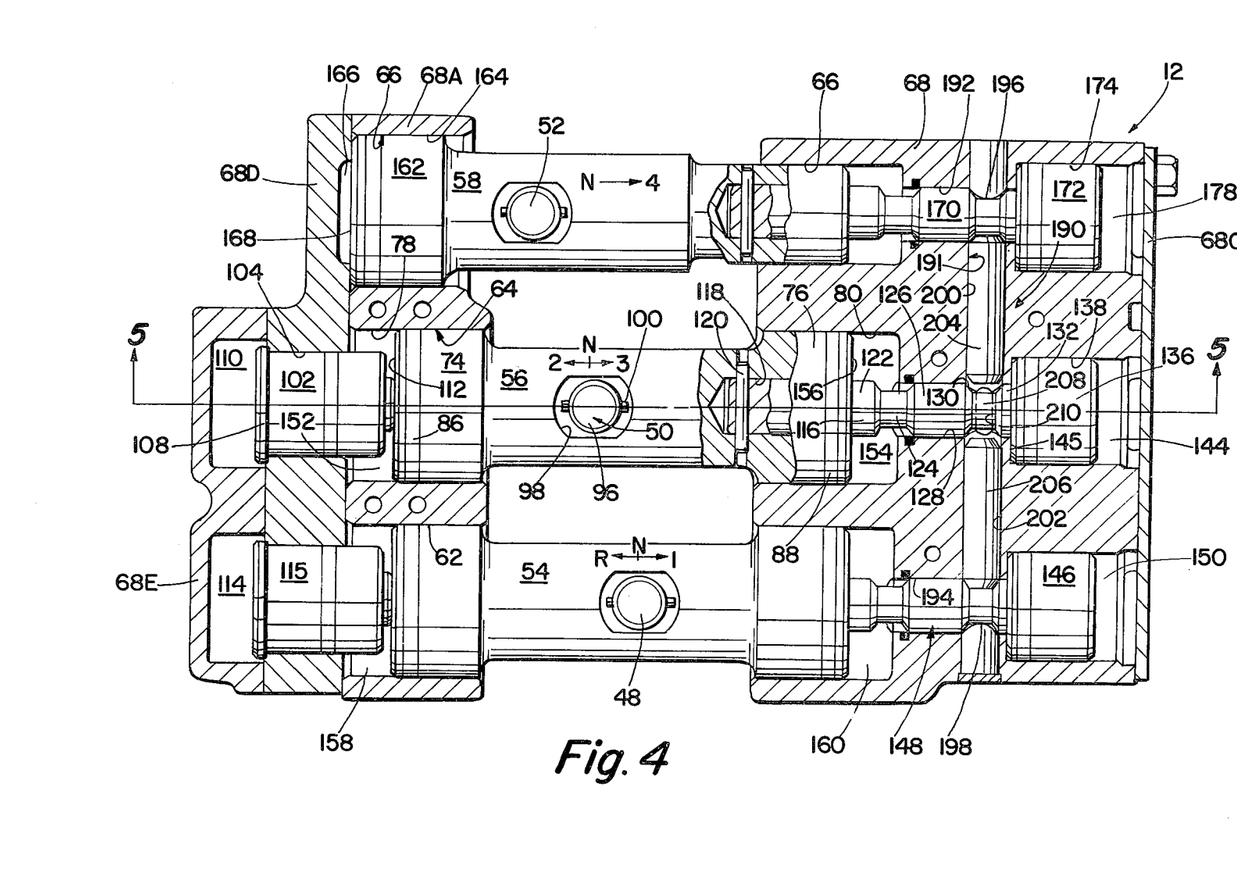
FIG. 4 is a top view, partially in section, of the shift bar housing assembly of the present invention taken along lines 4—4 in FIG. 3.
Figure 5:
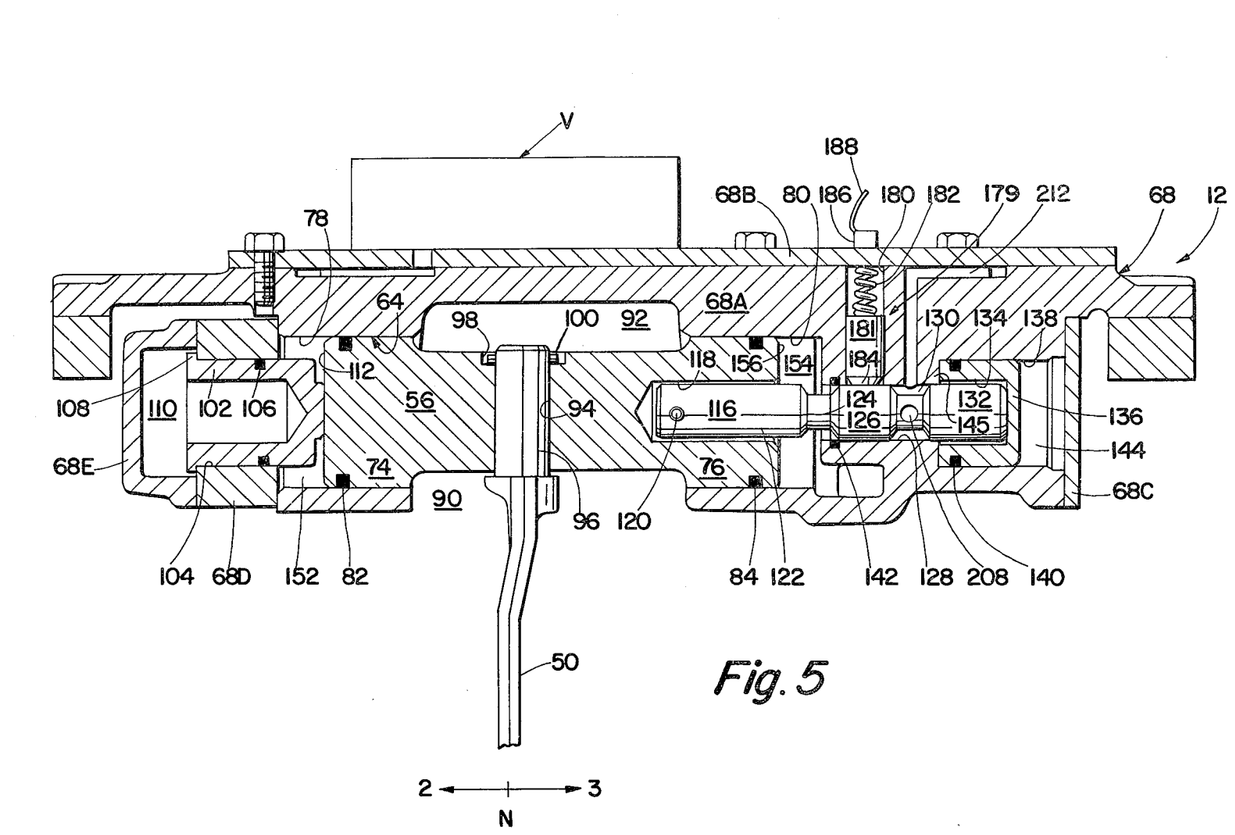
FIG. 5 is a side view, partially in section, of the shift bar housing of the present invention taken substantially along lines 5—5 in FIG. 4.

The details of construction of shift bar housing assembly 12 may be seen by reference to FIGS. 3, 4 and 5. As may be seen, shift bar housing assembly 12 comprises a shift bar housing 68 which is mountable as at flage 70 to a transmission housing as is well known, and which defines three substantially parallel bores 62, 64 and 66 in which shift bars 54, 56 and 58, respectively, are slidably received. Shift bar 54 carries shift fork 48 axially fixed thereto, shift bar 56 carries shift fork 50 axially fixed thereto and shift bar 58 carries shift fork 52 axially fixed thereto. Each of the shift forks 48, 50 and 52 define generally concave arcuate cavities at the free ends thereof which cavities are generally centered about the axis of rotation 72 of mainshaft 20. The shift forks may be of any known construction for cooperation with clutches 42, 44 and 46 for axial movement therewith and allowing relative rotational movement thereto. As may be seen, valve V is directly mounted to the shift bar housing 68 and preferably defines various fluid passages (not shown) at the interface therebetween. As is known valve V may also be remotely mounted relative to shift bar housing 68 with fluid lines providing fluid passages therebetween.

Shift bar housing 68 may be a multi-piece assembly comprising a main body portion 68A, cover portion 68B, a rightward end wall 68C, a leftward end wall 68D and a leftward end cap 68E, all of which may be suitably joined by welding, threaded fasteners, seals and the like. Various fluid passages and connections, such as connection 73, may be provided in valve V as fluid inlets and outlets. Fluid, electric and/or mechanical connections (not shown) providing control signals to the valve from the control C are also provided.

The structure and operation of shift bars 54 and 56, and the various apparatus associated therewith, are substantially identical as both shift bars 54 and 56 have an axially centered neutral position as shown and may be axially moved both to the right or the left from the shown position for engagement of a selected gear or transmission speed. The structure and operation of shift bar 58 and the apparatus associated therewith is similar to that of shift bars 54 and 56 but of a somewhat simpler structure as shift bar 58 is movable in only one axial direction, to the right, from the neutral position to a gear engaging position. The structure and operation of shift bar 56 and the apparatus associated thereof will be described in detail in being understood that the structure and apparatus associated with shift bar 54 is substantially identical. The structure and operation of shift bar 58 and the apparatus associated therewith will also be separately described below.

The shift bar housing assembly structure associated with shift fork 56 may be seen by reference to FIGS. 4 and 5. Shift bar 56 defines two enlarged exterior diameter piston portions 74 and 76 at the opposite axial ends thereof which piston portions are slidingly and sealingly received in noncontinuous portions 78 and 80 of bore 64. Annular seals 82 and 84 may be provided in grooves 86 and 88 of piston portions 74 and 76, respectively, to provide the sliding sealing relationship between the piston portions 74 and 76 and bore portions 78 and 80. An opening 90 in the bottom of housing 68 is provided intermediate to bore portions 78 and 80 through which shift fork 50 passes into the transmission. The transmission housing is, of course, provided with a complimentary opening therein. The dimensions of opening 90 are sufficient to permit unobstructed axial travel of shift fork 50 between its rightwardmost and leftwardmost axial positions. Opening 90 also extends upwardly and downwardly, as seen in FIG. 4, for passage of shift forks 52 and 48 from the shift bar housing assembly 12 into the transmission 10. The length of bore portions 78 and 80 is sufficient to retain sealing engagement with seals 82 and 84 in both the rightwardmost and leftwardmost axial positions of shift rod 56. A cavity 92 in shift bar housing 68 located generally above opening 90, as seen in FIG. 5, is provided between the bore portions 78 and 80 and allows for attachment of shift fork 50 to shift bar 56. Shift bar 56 is provided with a through bore 94 which is transverse the longitudinal axis thereof and in which is received a generally annular portion 96 of shift fork 50. Bore 94 is provided with a countersunk portion 98 and the upper end of shift fork portion 96 is provided with a roll pin or the like 100 for retaining shift fork 50 within bore 94 while allowing shift fork 50 to have a degree of relative rotational freedom relative to the shift bar 56. Allowing shift fork 50 a degree of relative rotational freedom relative to shift bar 56 will permit the shift fork 50 to more easily adapt to the position of clutch member 44 for all axial positions thereof. Of course, pin 100 could be replaced by a snap ring or the like provided in a groove at the upper end of shift fork portion 96 or shift fork 50 could be mounted to shift rod 56 in any known conventional manner. As may be seen, shift forks 52 and 48 are mounted to shift rods 58 and 54, respectively, in a similar manner to the mounting of shift fork 50 to shift rod 56.

A first centering piston 102 is slidably and sealingly received in a bore 104 defined in body end wall 68D. Bore 104 is generally concentric with bore 64. A seal 106 is provided for maintaining sealing contact between centering piston 102 and bore 104. Centering piston 102 is provided with a headed portion 108 received in a cavity 110 defined in end cap portion 68E. The radius of bore 104 is smaller than the outer diameter of headed portion 108 thus limiting the rightward travel of centering piston 102. As may be seen, centering piston 102, in its rightwardmost position, will engage leftward end surface 112 of shift bar 56 and urge shift bar 56 to the center or neutral position shown. Centering piston 102 and shift bar 56, when not in abutting engagement, are independently axially movable. Chamber 114, and corresponding centering piston 115, both associated with shift bar 54, are substantially identical to chamber 110 and piston 102. Chambers 110 and 114 are both constantly pressurized and thus shift bar 56 and 54 are both constantly urged rightwardly to the neutral position shown.

An axially extending elongated rod member 116 is received in an axially extending central cavity 118 provided in the rightward end of shift bar 56, and a pin member 120 fixes rod member 116 to shift bar 56 for axial movement therewith and pivotal movement relative thereto. Rod member 116 includes a leftward land portion 122 loosely received in bore 118, an annular groove portion 124 a land portion 126 received in bore 128 defined by housing body 68A and generally concentric with bore portion 80, an annular groove portion 130 and a rightward end land portion 132. Rightward land portion 132 is loosely received in a leftwardly opening blind bore 134 formed in centering piston 136 which is slidably and sealingly received in a bore 138 generally concentric with bore 80 and 128. An annular seal 140 is provided on the outer periphery of centering piston 136 to seal the sliding surfaces of piston 136 and bore 138. An additional annular seal 142 may be provided in bore 128.

The leftward axial travel of second centering piston 136 is limited by the shoulder 145 defined between bores 138 and 128. In the leftwardmost position as shown, centering piston 136 will abut with land 132 of rod 116 to urge shift rod 56 leftwardly to the centered position shown, a cavity 144 is defined by bore 138 and end plate 68C which cavity is constantly pressurized and thereby centering piston 136 will constantly urge shift bar 56 leftwardly to the centered position shown. When not in abutting engagement, second centering piston 136 and rod member 116 are independently axially movable. Preferably, the pressurization of chambers 144 and 110, and the surface areas of pistons 102 and 136 are substantially identical and thus a substantially equal leftward and rightward force will constantly center shift bar 56. A similar centering piston 146, rod member 148 and constantly pressurized cavity 150 is provided in connection with shift rod 54.

A first selectively pressurized cavity 152 is defined by bore portion 78 of bore 64, leftward face 112 of shift rod 56 and the rightward face of centering piston 102. A similar second selectively pressurized cavity 154 is defined by the rightwardly facing end face 156 of shift rod 56, bore portion 80 of bore 64 and the sliding engagement of land 126 with bore portion 128. The surface areas of piston faces 112 and 156 are greater than the surface areas of centering pistons 102 and 136 as may be seen.

In operation, to shift transmission 12 into second gear, control C will manually or automatically cause valve V to supply pressurized fluid to chamber 154. Preferably, for ease of valving, the pressure of fluids supplied to chambers 110, 152, 154 and 144 will be substantially identical. Pressurized fluid, such as pressurized air or the like, will typically be supplied to the chambers at about 80 pounds per square inch regulated pressure. Pressurization of chamber 154 will create an axially leftward force on shift rod 56 greater in magnitude than the rightward centering force applied by centering piston 102. Typically, at 80 pounds per square inch pressurization, the leftward axial force on shift rod 56 when chamber 154 is pressurized will be aoproximately 270 pounds axial force which will be resisted by a rightward axial force of approximately 150 pounds supplied by pressurization of centering piston 102. Shift bar 56 will thus move axially leftwardly under the influence of a resultant axial force of approximately 120 pounds against the fluid bias of centering piston 102 forcing shift bar 56 and centering piston 102 to move leftwardly until piston 102 engages the end cap 68E. Rod portion 132 will separate from abutting engagement with centering piston 136. When a shift from second back to neutral is required, valve V will cause chamber 154 to be vented or exhausted to atmosphere and centering piston 102 will move rightwardly with shift rod 56 until rod portion 132 engages centering piston 136 at which point the shift rod 56 will be centered in the neutral position as shown. To shift transmission 12 from neutral to third gear, chamber 152 is selectively pressurized causing shift bar 56 to move rightwardly against the bias of centering piston 136 and separating from abutting engagement of centering piston 102 until centering piston 136 engages end wall 68C. When a shift from third gear back to neutral is required, chamber 152 will be vented to atmosphere and centering piston 136 will caus the rod 116 and shift bar 56 to move leftwardly until end face 112 engages centering piston 102 and the shift bar 56 will be centered in the neutral position as shown.

Selectively pressurized chamber 158, substantially identical to chamber 152 and selectively pressurized chamber 160, substantially identical to chamber 154, is provided in connection with shift bar 54 for selective axial movement of shift bar 54 to engage first and reverse gears.

Shift rod 58 is somewhat simpler in structure as it is movable from neutral to only one engaged position. Shift rod 58 includes a piston portion 162 slidably and sealingly engaged in bore portion 164 of bore 66. A selectively pressurized chamber 166 is defined by the leftward end face 168 of piston portion 162, bore portion 164 and end wall 68D. At its rightward end, a rod member 170, substantially identical to rod member 116 described above is pivotably mounted to shift rod 58 for axial movement therewith and cooperates with a centering piston 172, substantially identical to centering piston 136 described above, which centering piston 172 is slidably received in a bore 174 which defines a constantly pressurized chamber 178, substantially identical with constantly pressurized chamber 144 described above. To shift transmission 12 into fourth gear from neutral, chamber 166 is pressurized causing the shift bar 58 to move against the constant bias of centering piston 172. To shift the transmission 12 from fourth back to neutral, chamber 166 is vented to atmosphere causing centering piston 172 to urge shift bar 58 leftwardly to the neutral position shown.

Figure 6:
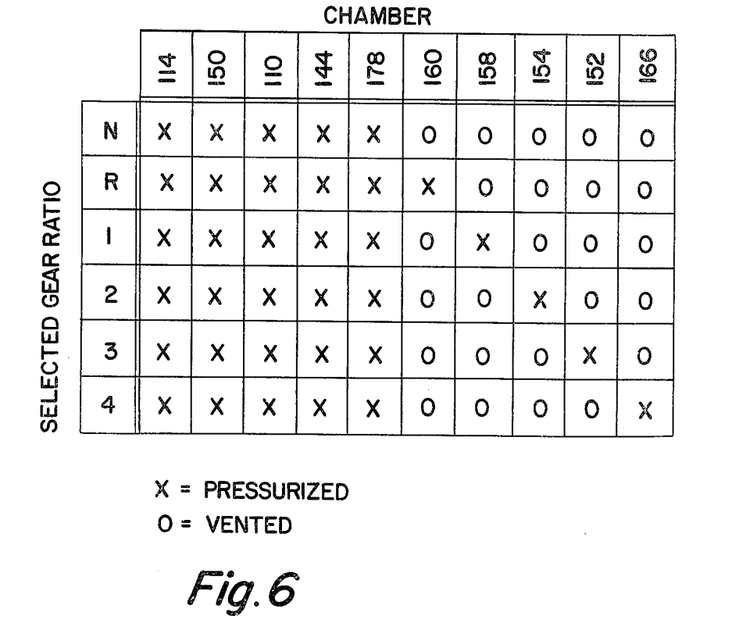
FIG. 6 is a table illustrating the pressurized condition of the various piston chambers of the shift bar housing of FIGS. 3, 4 and 5 for each selected gear ratio of the transmission of FIG. 1.

Reference to FIG. 6 provides a table illustrating the condition of the various chambers for the various selected gear ratios or speeds of transmission 10. In FIG. 6, "X" represents pressurization of a chamber while "0" represents venting of the chamber to atmosphere. Preferably, the pressurized fluid, such as pressurized air or pressurized hydraulic fluid, is provided to all chambers at a substantially equal pressure. Various fluid passages and fluid seals are provided in the body 68 which passages are formed in accordance with the prior art and are not illustrated for purposes in simplication of the illustration of the present invention.

It is understood that shift bar housing assembly 12 may comprise any number of either three position shift bars having two axially displaced engaged positions and an axially central neutral position such as shift bars 56 and/or 54 and/or two position shift bars having a single axially displaced engaged position and an axially centered neutral position similar to shift bar 58.

As have been noted above, elongated rod members 116, 148 and 170 are mounted to shift bars 52, 56 and 54, respectively, for axial movement therewith and pivotal movement relative thereto. This is an important feature as it allows for slight misalignment of the various bores and bore portions, such as bore portion 80, bore 128 and bore 138 without causing a hang up of the various shift bars and centering pistons.

As has been mentioned above, an important feature of this invention is that transmission 10 will remain in an engaged gear in the event of a lost of fluid pressure, such as a failure of source S, or a failure of fluid conduit or the like. This is an important feature as may be seen by considering the utilization of transmission 10 in a vehicle. It is important to assure that the transmission of a vehicle is not suddenly and unintentionally shifted from an engaged gear into neutral. It may also be important that the transmission remain in the engaged gear in the event of a loss of system pressure thereby providing the possibility that the vehicle may proceed to a safe location. This is normally referred to as a "limp home" capability. By utilizing fluid pressurized shift bar actuation in combination with fluid pressurized return to the neutral position, a loss of fluid pressure should not result in an unintentional shifting of transmission 10 from an engaged gear speed to the neutral position in the event of a loss of fluid pressure. To provide additional assurance that the transmission 10 will not shift from an engaged gear to the neutral position in the event of a loss of system fluid pressure, each shift rail, 54, 56 and 58, is provided with a an engaged position detent mechanism only one of which 179 is illustrated. Detent mechanism 179 comprises a plunger 181 slidably received in a bore 180 which extends transverse to and intersects bore 128. Plunger 181 is resiliently biased by a spring 182 radially inwardly toward the axis of bore 128. Plunger 181 includes a ramped tip 184 generally conforming to the ramped side walls of grooves 124 and 130. Plunger 181 will align with land 126 of rod 116 in the neutral position of shift bar 56, will align with and engaged annular groove 130 in the leftward axial position of shift bar 56 and will align with and engage annular groove 124 in the rightward axial position of shift bar 56. For example, assuming chamber 154 is pressurized for selection of second speed operation of transmission 10, shift bar 56 will shift axially leftwardly and plunger 181 will move radially inwardly (downwardly in FIG. 5) into groove 130. The configuration of the cooperating ramps of plunger tip 184 and the grooves 130 and 124, and the magnitude of the force supplied by spring 182, is such that the axial force required to axially move shift bar 56 against the axial bias of plunger 181 when the plunger is engaged with groove 124 or groove 130 is less than the axial centering force supplied by the centering pistons 136 or 102 when chambers 144 or 110, respectively are pressurized. Accordingly, when a supply of pressurized fluid to the centering chambers 144 and 110 is not interrupted, the detent mechanism 181 will not prevent the proper centering action of the centering pistons 136 and 102. However, in the event of a loss of fluid pressure, the detent mechanism will tend to retain the shift bar 56 in either the rightwardmost or leftwardmost position against the effects of vibration and the like. Typically, the resistance to axial movement of shift bar 56 supplied by detent mechanism 179 is about 40 pounds and is significantly less than the typical 150 pounds of axial centering force supplied by the centering pistons 136 and 102.

As an additional feature, each of the detent mechanisms may be provided with a sensor or switch mechanism only one of which 186 is illustrated. Sensing mechanism 186 will provide a signal corresponding to the axial position of plunger 178 in bore 180 which signal may be transmitted via a line 188 to the control mechanism for determining if the shift bar is in the neutral position, corresponding to the retracted position of plunger 178 as illustrated in FIG. 5, or if the shift bar is in a gear engaging position, corresponding to an extended position of plunger 178. Accordingly, by utilizing a sensor 186 in connection with one or all of the shift rods 54, 56 and 58, signals may be provided confirming that one or all of the transmission shift bars are in the neutral position. This is considered to be a much more accurate indication of a shift bar being in the neutral position than simply sensing pressurization or venting of any of the chambers as mere pressurization of a chamber may not result in an immediate axial movement of the shift bar due to torque hang ups and the like as is well known in the art.

Preferably, shift bar housing assembly 12 is also provided with an interlock mechanism 190 for preventing movement of any two of the shift bars 54, 56 or 58 when any other one of the shift bars is moved from the neutral position. Briefly, shift bar housing 68 is provided with a transverse bore 191 transverse to and intersecting bore portion 192 of bore 66, bore portion 128 of bore 64 and bore portion 194 of bore 62. Annular groove 196 of rod portion 170, annular groove 130 of rod 116 and groove 198 of rod 148 will align with bore 191 when the respective shift bars are in the neutral positions thereof. Bore 191 includes a bore portion 200 extending between bore portions 192 and 128 and an aligned bore portion 202 extending between bore portions 128 and 194. Slidably received in bore portion 191 is a pin member 204 having an axial length generally equal to the sum of the axial length of bore portion 200 added to the radial depth of either of the grooves 196 or 130. Slidably received in bore portion 202 is a pin member 206 having an axial length generally equal to the sum of the axial length of bore portion 202 added to the depth of either of the annular grooves 130 or 198. A transfer pin member 208 is slidably received in a bore 210 provided in rod member 116 through the groove portion 130 thereof and generally aligned with bore 191. Transfer pin 208 has an axial length generally equal to the sum of the axial length of bore 210 added to the depth of groove 130. Movement of any of the shift bars from the neutral position thereof will result in axial movement of pins 204, 208 and 206 into firm contact with annular groove portions of the other shift bar members thereby locking the other shift bar members in the neutral position as is well known in the art. The structure and operation of interlock mechanisms of this type is well known in the art and further details thereof will not be provided herein.

As may be seen by reference to FIG. 5, bore portion 128 is vented via a passage 212 to exhaust possible fluid pressure build ups resulting from movements of the piston portions or the rod members. Exhaust 212 is vented to atmosphere adjacent the shift bar housing cover member 68B thereby assuring the pressurized fluid is not forced into transmission 10.

Although this invention has been described in its preferred form with a certain degree of particularity, it is understood that the present disclosure of the preferred form has been made only by way of example and that numerous changes in the detailed construction and combination and arrangement of the parts may be resorted to without departing from the spirit and the scope of the invention as hereinafter claimed.

I claim:

1. A pressurized fluid operated shift bar housing assembly for a change gear transmission, said assembly comprising:

a shift bar housing having an axially extending bore therein;

a shift bar slidably received in said bore, said shift bar having a first axial position and a second axial position relative to said housing;

a shift fork associated with said shift bar, said shift fork associated with a transmission gear engaging clutch member and effective to hold said clutch member disengaged in the first axial position of said shift bar and effective to cause engagement of said clutch member in the second axial position of said shift bar;

a first constantly pressurized fluid chamber defined by said housing, a first piston slidably and sealingly received in said first chamber, said first piston acted upon by pressurized fluid in said first chamber for applying a first axially directed force on said shift bar when said shift bar is axially displaced from said first axial position tending to bias said shift bar toward said first axial position;

a second selectively pressurized fluid chamber defined by said housing, a second piston slidably and sealingly received in said second chamber, pressurization of said second chamber effective to cause said second piston to move said shift bar to said second axial position with a second axial force greater than and oppositely directed relative to said first axial force;

valve means connectable to a source of pressurized fluid for constantly pressurizing said first chamber and for selectively pressurizing and exhausting said second chamber; and a detent mechanism effective to apply a resilient detent force to said shift bar in the second axial position thereof, said resilient detent force resisting axial movement of said shift bar, said resilient detent force having an axial component smaller than the magnitude of said first axial force.

2. The assembly of claim 1, wherein said second piston has an effective surface area exposed to pressurized fluid in said second chamber greater than the effective surface area of said first piston exposed to pressurized fluid in said first chamber and wherein said fluids constantly supplied to said constantly pressurized first chamber and selectively supplied to said selectively pressurized second chamber are at substantially equal pressurization.

3. The assembly of claims 1 or 2, wherein said detent mechanism comprises a detent bore in said housing extending generally transverse to and intersecting said axially extending bore and a detent plunger slidably received in said detent bore and resiliently biased toward said axially extending bore, and wherein said shift bar is provided with an annular detent groove and an adjacent land portion, said land portion aligning with said detent bore in the first axial position of said shift bar and said annular detent groove aligning with said detent bore in the second axial position of said shift bar whereby said detent plunger will be received in and engage said annular detent groove when said shift bar is in the second axial position.

4. The assembly of claim 3, wherein the inner end of said detent plunger and the side walls of said annular detent groove are provided with substantially complimentary ramp surfaces.

5. The assembly of claim 3, additionally comprising a sensor for sensing the axial position of said detent plunger relative to said detent bore, said sensor providing a signal indicating said shift bar is in the first axial position and said clutch member is disengaged.

6. The assembly of claim 3, wherein said shift fork is mounted to said shift bar for axial movement therewith and a degree of rotational movement relative thereto.

7. The assembly of claim 6, wherein the portion of said shift bar provided with said land is pivotably connected to the portion of said shift bar to which said shift fork is mounted.

8. The assembly of claims 1 or 3, wherein said shift fork is mounted to said shift bar for axial movement therewith and a degree of rotational movement relative thereto.

9. The assembly of claim 8, wherein said shift bar is provided with a substantially annular bore therein and said shift fork includes a substantially annular portion rotationally received in said bore in said shift bar.

10. A fluid operated shift bar housing assembly for a change gear transmission, said assembly comprising:
a shift bar housing having an axially extending shift bar bore therein;
a shift bar slidably received in said shift bar bore, said shift bar having an axially centered position, a first axially displaced position wherein said shift bar is axially displaced from said centered position in a first axial direction and a second axially displaced position wherein said shift bar is axially displaced from said centered position in a second axial direction;
a shift fork associated with said shift bar and axially moved thereby, said shift fork effective to cause engagement of a first transmission gear in the first axially displaced position of said shift bar and effective to cause engagement of a second transmission gear in the second axially displaced position of said shift bar, said shift fork effective to disengage said first and second transmission gears in the centered position of said shift bar;
a first constantly pressurized fluid chamber defined by said housing, a first centering piston slidably and sealingly received in said first constantly pressurized fluid chamber, said first centering piston applying a first axially directed force on said shift bar when said shift bar is axially displaced from said centered position in said first axial direction tending to bias said shift bar toward said centered position;
a second constantly pressurized fluid chamber defined by said housing, a second centering piston slidably and sealingly received in said second constantly pressurized fluid chamber, said second centering piston applying a second axially directed force on said shift bar when said shift bar is axially displaced from said centered position in said the second axial direction tending to bias said shift bar toward said axially centered position;
a first selectively pressurized fluid chamber defined by said housing, a first shifting piston slidably and sealingly received in said first selectively pressurized fluid chamber, pressurization of said first selectively pressurized fluid chamber effective to cause said first shifting piston to axially move said shift bar from said centered position to said first axially displaced position with an axial force greater than and opposite from said first axially directed force;
a second selectively pressurized fluid chamber defined by said housing, a second shifting piston slidably and sealingly received in said second selectively pressurized fluid chamber, pressurization of said second selectively pressurized fluid chamber effective to cause said second shifting piston to axially move said shift bar from said centered position to said second axially displaced position with an axial force greater than and opposite to said second axial force;
valve means connectable to a source of pressurized fluid for constantly pressurizing said first and second constantly pressurized fluid chambers and for selectively pressurizing and exhausting said first and second selectively pressurized fluid chambers; and
a detent mechanism effective to apply a resilient detent force to said shift bar when said shift bar is in the first and the second axially displaced positions thereof, said detent mechanism applying a resilient detent force tending to resist axial movement of said shift bar, said resilient detent force having an axial component in both the first and second axial directions having a smaller magnitude than both said first and second axial forces.

11. The assembly of claim 10, wherein said first shifting piston has an effective surface area exposed to pressurized fluid in said first selectively pressurized chamber which is greater than the effective surface area of said first centering piston exposed to pressurized fluid in said first constantly pressurized chamber, said second shifting piston has an effective surface area exposed to pressurized fluid in said second selectively pressurized fluid chamber which is greater than the effective surface area of said second centering piston exposed to fluid pressure in said second constantly pressurized chamber and wherein said fluids constantly supply to first and second constantly pressurized chambers and selectively supplied to said first and second selectively pressurized chambers are at substantially equal pressurization.

12. The assembly of claims 10 or 11, wherein said detent mechanism comprises a detent bore in said housing extending generally transverse to and intersecting said shift bar bore and a detent plunger slidably received in said detent bore and resiliently biased toward said shift bar bore, and wherein said shift bar is provided with a land portion having a first annular detent groove on one axial side thereof and a second annular detent groove on the other axial side thereof, said land aligning with said detent bore in the axially centered position of shift bar, said first annular detent groove aligning with said detent bore in the first axially displaced position of said shift bar and said second annular detent groove aligning with said detent bore in the second axially displaced position of said shift bar, alignment of said first annular detent groove with said detent bore effective to cause said detent plunger to extend from said detent bore and engage said first detent groove for applying said resilient detent force to said shift bar, alignment of said second annular detent groove with said detent bore effective to cause said detent plunger to extend from said detent bore and engage said second detent groove for applying said resilient detent force to said shift bar.

13. The assembly of claim 12, wherein said detent plunger is provided with ramps on the inner end thereof and said first and second annular detent grooves are provided with ramp surfaces on either side thereof which are substantially complimentary to the ramp surfaces on said detent plunger.

14. The assembly of claims 10 or 11, wherein said shift fork is carried by said shift bar for axial movement therewith and relative rotation thereto.

15. The assembly of claims 10 or 11, wherein said shift bar is independently axially movable relative to said first centering piston when moving between said centered and said second axially displaced positions thereof and is independently axially movable relative to said second centering piston when moving between said centered and said first axially displaced positions thereof.

16. The assembly of claims 10 or 11, wherein said first and second shifting pistons are formed integrally with said shift bar.

17. The assembly of claim 12, wherein said first and second centering pistons are each independently axially movable relative to said shift bar.

18. The assembly of claim 12, additionally comprising a sensor for sensing the axial position of said detent plunger relative to said detent bore.

* * * * *